United States Patent [19]

Hamon et al.

[11] 3,723,874

[45] Mar. 27, 1973

[54] NOISE FIGURE METER

[75] Inventors: Bernard Hamon, Conflans-Sante-Honorine; Jean-Pierre Montel, Meulan, both of France

[73] Assignee: Lignes Telegraphiques Et Telephoniques, Paris, France

[22] Filed: Jan. 31, 1972

[21] Appl. No.: 222,250

[30] Foreign Application Priority Data

Feb. 2, 1971 France....................7103375

[52] U.S. Cl.....................324/158 T, 324/57 N

[51] Int. Cl.....................G01r 31/22, G01r 27/00

[58] Field of Search....324/158 T, 57 N, 57 SS, 57 R; 330/2

[56] References Cited

UNITED STATES PATENTS

| | | | |
|---|---|---|---|
| 2,901,696 | 8/1959 | Mollfors | 324/57 N |
| 3,506,915 | 4/1970 | Harris et al. | 324/57 R |

*Primary Examiner*—Rudolph V. Rolinec
*Assistant Examiner*—Ernest F. Karlsen
*Attorney*—Abraham A. Saffitz

[57] ABSTRACT

Improvement to noise figure meters which comprise a broadband noise power source in the form of a temperature limited diode having an output resistor forming the input resistance of an amplifier device to be tested, switching means for selectively connecting the output of said diode to said resistor and for cumulating the noise power created by the diode and the noise power of the amplifier device, a pass-band filter connected to the output of the amplifier device, an attenuator having an attenuating factor of $\sqrt{2}$, switching means for selectively inserting the attenuator at the output of the filter, a detector for detecting the noise power of the amplifier device alone and the cumulated noise power of the noise source and amplifier device attenuated by $\sqrt{2}$ and for deriving therefrom two RMS noise signals, two capacitors for respectively storing said RMS noise signals and a comparator for determining the equality of said signals. The improvement consists of a capacitor-resistor charge circuit and an amplifier of the charging current of the capacitor. The amplified current is applied to the heater of the diode and the charge is stopped when the comparator detects the equality of the RMS noise signals.

3 Claims, 3 Drawing Figures

NOISE FIGURE METER

This invention relates to instruments for automatically and accurately measuring and indicating the noise figure of electrical devices such as transistors, more particularly of radio-frequency transistor amplifiers.

It is known, in the noise figure measurement technique that an amplifier to be tested can be considered a noiseless amplifier with an associated noise voltage $e_r$ at its input. A noise source having an associated noise voltage $e_T$ and a source resistance $R_g$ is connected to the input of the amplifier.

The source resistance noise voltage $e_T$ is independent of frequency but is directly proportional to the noise bandwidth. From statistical theory: :

$$e_T = \sqrt{4\,k\,T\,B\,R_g}$$

where $k$ is the Boltzmann's constant equal to $1.38 \times 10^{-23}$ Joule/°K, $T$ the absolute temperature in degrees Kelvin and $B$ the effective noise bandwidth in hertz.

If A is the gain of the amplifier, the noise factor is equal to $$NF = [(A\bar{e}_T)^2 + (A\bar{e}_r)^2] / (A\bar{e}_T)^2$$

$$NF = \bar{e}_o^2 / A^2\, 4k\,T\,B\,R_g \qquad (1)$$

where $\bar{e}_o$ is the output RMS noise voltage.

If a broadband noise source, such as a temperature limited diode, is used, the RMS noise voltage $\bar{V}_n$ is equal to:

$$\bar{V}_n = (2\,\epsilon I_b\,B)^{1/2}\,R_g$$

and $$\bar{e}_o = A\bar{V}_n$$

With the noise source output set to zero, one can note the RMS noise voltage $e_o$ on a power meter or RMS voltmeter, then apply a noise sufficient to increase the meter indication by exactly 3 db. The quantity $A\,\bar{V}_n$ is then equal to $e_o$ so the noise factor can be calculated from:

$$NF = 2\,\epsilon\,I_b\,B\,R_g^2/4k\,T\,B\,R_g = (\epsilon/2kT)I_bR_g \qquad (2)$$

where $\epsilon$ = electronic charge = $1.6 \times 10^{-19}$ coulombs and $I_b$ the diode direct current.

By replacing $k$ and $\epsilon$ by their numerical values and making $T = 298$°K, one finds:

noise factor = $NF = 20\,I_b\,R_g$ noise figure = $F = 10\log_{10} 20\,I_b\,R_g$ This shows that for a given value of $R_g$, the noise factor or its logarithmic equivalent noise figure can be calibrated directly in terms of the diode direct current $I_b$.

Apparatuses have been previously developed for automatically determining the noise figure of transistor amplifiers and providing a direct reading of this noise figure. In these devices, a reference noise produced by a noise generator is periodically passed through the device to be tested and the output signal of the device alone is compared to the output signal of the device when the reference noise is applied thereto. The value of the reference noise is then varied until the combined signal of the device under test plus the reference noise source is exactly twice the value of the signal of the device alone. When this condition is attained, the value of the reference noise will just equal the value of the internal noise of the device and, since the reference noise value is known, the value of the internal noise of the device is also known.

A variation of the prior art method mentioned above uses an attenuator between the noise level detector and the amplifier under test. The output reference noise level is noted as before. An attenuation of 3 db is then inserted and the noise diode current is raised to bring the meter back to the initial reference point. This technique tends to eliminate errors due to inaccuracies in the meter, because the meter is being used as a reference level indicator and not to make to noise measures, the second being twice the first.

The difference of the RMS noise voltages measured by the meter when the noise generator and the attenuator are disconnected (unknown input noise voltage alone) and when the noise generator is connected and the attenuator is inserted (input noise voltage + source termination noise voltage, the sum being attenuated by $\sqrt{2}$) is integrated and smoothed and is applied to the noise generator for varying its output. Thus the instrument includes a looped circuit and tends to oscillate when the tests are at radiofrequency, said 12 and 60 MHz. Further rapid switching between noise amplifier alone and noise amplifier + noise generator is not compatible with small bandwidth tests. The response time of the amplifier to be tested is inversely proportional to the bandwidth of the filter inserted in the instrument circuit. If the bandwidth is small, rapid switching distorts the measurements.

The object of the invention is to provide a novel noise figure meter which will rapidly and automatically give accurate determinations of the noise figure of transistor amplifiers in the low frequency region where the noise factor varies approximately inversely with frequency and in the high frequency region where it varies approximately proportionally to the square of the frequency.

For example the apparatus allows tests at 60 kHz and 12 MHz or tests at 60 kHz and 60 MHz to be made by only changing the filters of the instrument.

Generally speaking, the instrument includes a programmer initiated by a starting key and comprising three operation periods $T_1$, $T_2$ and $(T_3 - T_2)$. Period $T_1$ has a predetermined duration and the sum of periods $T_2$ and $(T_3 - T_2)$ has also a predetermined duration. Periods $T_2$ and $(T_3 - T_2)$ have durations depending upon the very instant when the amplifier noise is equal to the combined noise of the amplifier plus the noise generator attenuated by $\sqrt{2}$. The range of the diode current is scanned from the beginning of period $T_2$ until the instant mentioned above which marks the end of period $T_2$. The diode current at this instant is measured by a RMS voltmeter. It is to be noticed that at the instant of the measurement, the noise detector of the instrument is disconnected from the noise generator thereby preventing any oscillation of the instrument loops which intervened in the prior art instruments.

The object and the features of the present invention will be apparent from the following description thereof taken in connection with the accompanying drawings in which.

Figure 1:
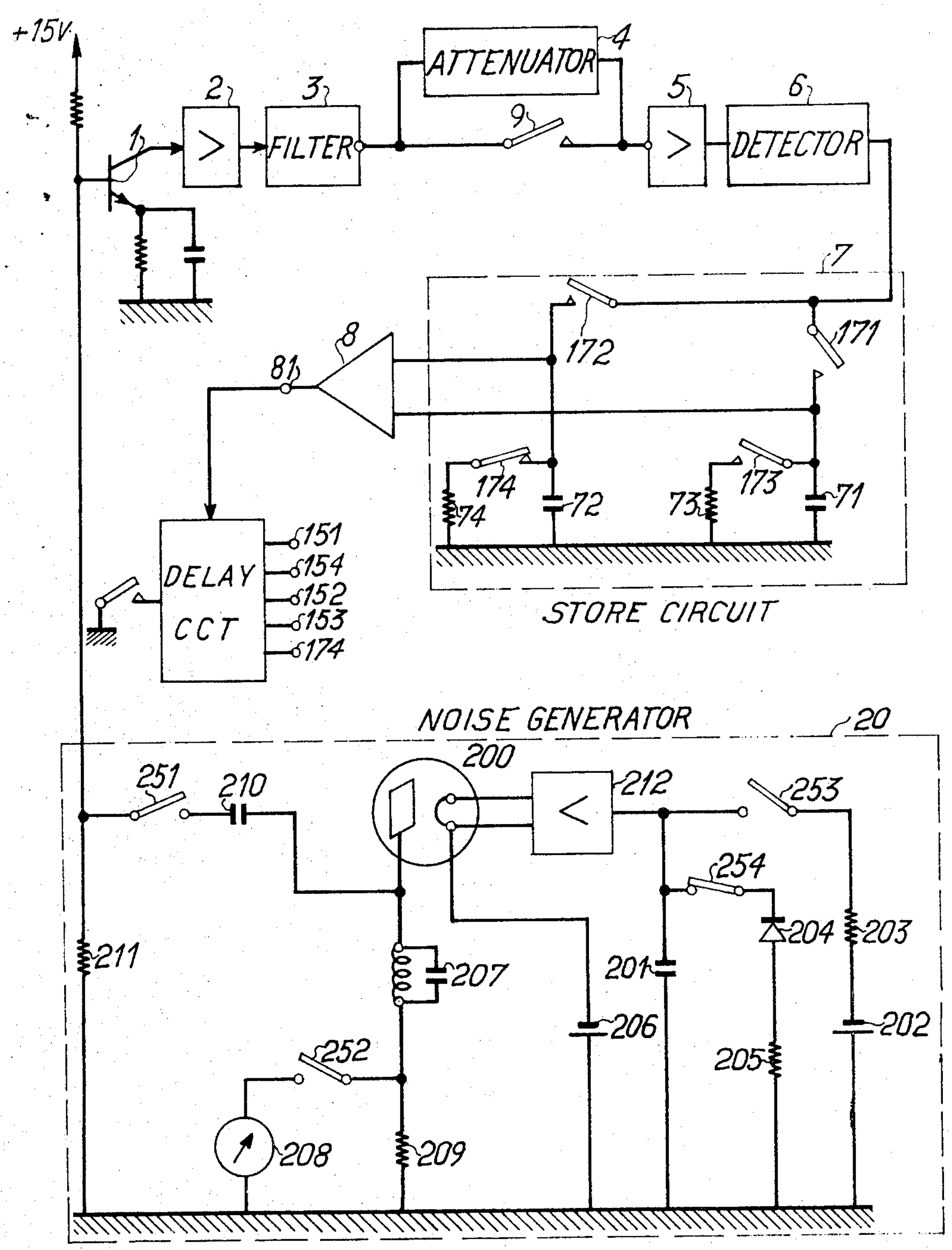
FIG. 1 is a block diagram of a typical noise figure meter embodying the present invention.

Referring now to FIG. 1, the transistor to be tested is designated by reference numeral 1 and its emitter is grounded by a R-C circuit, its base is connected to the output resistance of the noise generator and its collector to the circuit chain of the instrument. This chain comprises a linear amplifier 2, and a pass-band filter 3 which serves to isolate the desired portion of the noise spectrum of the device under test. For example when testing RF transistors, the filter 3 may be designed so that only bandwidths of 5 percent centered on predetermined frequencies, say 60kHz and 12 MHz, will be passed and frequencies outside said bandwidths filtered out.

A switch 9 controlled by a programmer which will be disclosed later and which may be electromechanical or electronic is arranged to alternately insert between filter 3 and an amplifier 5 or short-circuit an attenuator 4 having an attenuation ratio of $\sqrt{2}$. The output of amplifier 5 is connected to a detector 6. It is not necessary that this detector be quadratic since it always operates at the same input noise signal.

The output of detector 6 can be selectively connected to capacitors 71 and 72 of store circuit 7 respectively through interrupter switches 171 and 172 controlled by the programmer. Capacitors 71 and 72 can be discharged respectively through switches 173 and 174 and resistors 73 and 74, switches 173 and 174 being also controlled by the programmer.

The active terminals of capacitors 71 and 72 are respectively connected to the inputs of a comparator 8, the output 81 of which is connected to programmer 10. Comparator 8 is an operational amplifier which gives an output signal when the difference of the signals applied to its direct and inverted inputs is equal to zero. Such operational amplifiers are known in the art under the name of $\mu$A 710 amplifiers.

The output signal of comparator 8 triggers programmer 10 which will be described later on.

The noise generator 20 comprises a directly heated thermionic diode 200. Its filament is directly heated in order to lower the thermal inertia of the tube and allow the cycle of the instrument to be short. The diode tube may be a diode 290 RT manufactured by "La Radiotechnique," a French Company of Suresnes, France. The normal anode voltage is 100 volts and under this voltage the anode current characteristic versus heating current is quadratic. It becomes linear if the anode voltage is reduced to about 15 volts.

The heating current is generated by charging capacitor 201 from current source 202 through resistor 203 and closed switch 253. Capacitor 201 can discharge through closed switch 254, Zener diode 204 and resistor 205. Zener diode 204 prevents the complete discharge of the capacitor. The charging current is amplified by current amplifier 212 and applied to the filament of diode 200.

The filament forming the cathode is biased by means of voltage source 206, of say 15 volts.

Tube 200 is loaded by a parallel L-C circuit 207 tuned to the mid frequency of the bandwidth of filter 3 and by an ammeter 208 shunted by resistor 209. A switch 252 permits to connect the ammeter in the anode circuit or to disconnect it therefrom.

The anode circuit comprises capacitor 210, switch 251, resistor 211 and the base resistance of the transistor to be tested. Resistor 211 plays the part of resistor $R_0$ referred to in the introductory part. It has a value of about 400 ohms.

Figure 2:
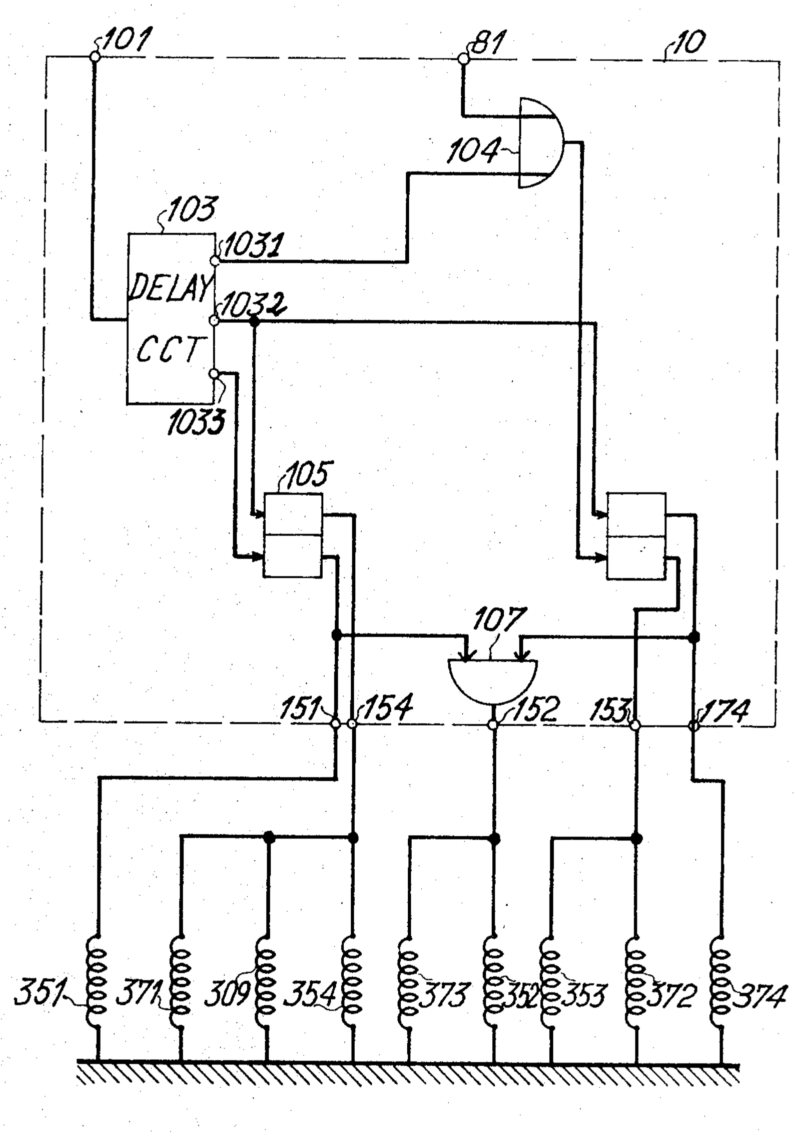
FIG. 2 is a block diagram of the programmer comprised in the apparatus.

FIG. 2 shows the structure of programmer 10.

The starting key 101 of programmer 10 is connected to a delay circuit 103 with multiple outputs of a known type. This delay circuit, controlled by depressing the starting key 101, delivers successive pulses at its outputs 1031, 1032, 1033, these pulses having predetermined delays with respect to the start signal produced by the key.

There appear successively a pulse on terminal 1031 at the beginning of the cycle, a pulse on terminal 1032 at time $T_1$ and a pulse on terminal 1033 at time $T_3$. Delay circuit outputs 1032 and 1033 are connected to the one and zero inputs of a flipflop 105. The output terminal 81 of comparator 8 and the delay circuit output 1031 are connected to the inputs of an OR-gate 104 whose output is connected to the one input of a flipflop 106, the zero input of said flipflop being connected to terminal 1032.

The one and zero outputs of flipflop 105 are designated by 151 and 154 and those of flipflop 106 by 153 and 174. An AND-gate 107 has its two inputs respectively connected to outputs 151 and 174 and its output is designated by 152.

The switches of FIG. 1 are assumed to be electromechanical relays and they have a switch blade 9, 171, 172, 173, 174, 251, 252, 253, 254, and a switch coil 309, 371, 372, 373, 374, 351, 352, 353, 354. Terminal 151 of programmer 10 is connected to coil 351, terminal 154 to coils 309, 354, 371, terminal 152 to coils 352 and 373, terminal 153 to coils 353 and 372 and terminal 174 to coil 374.

Figure 3:
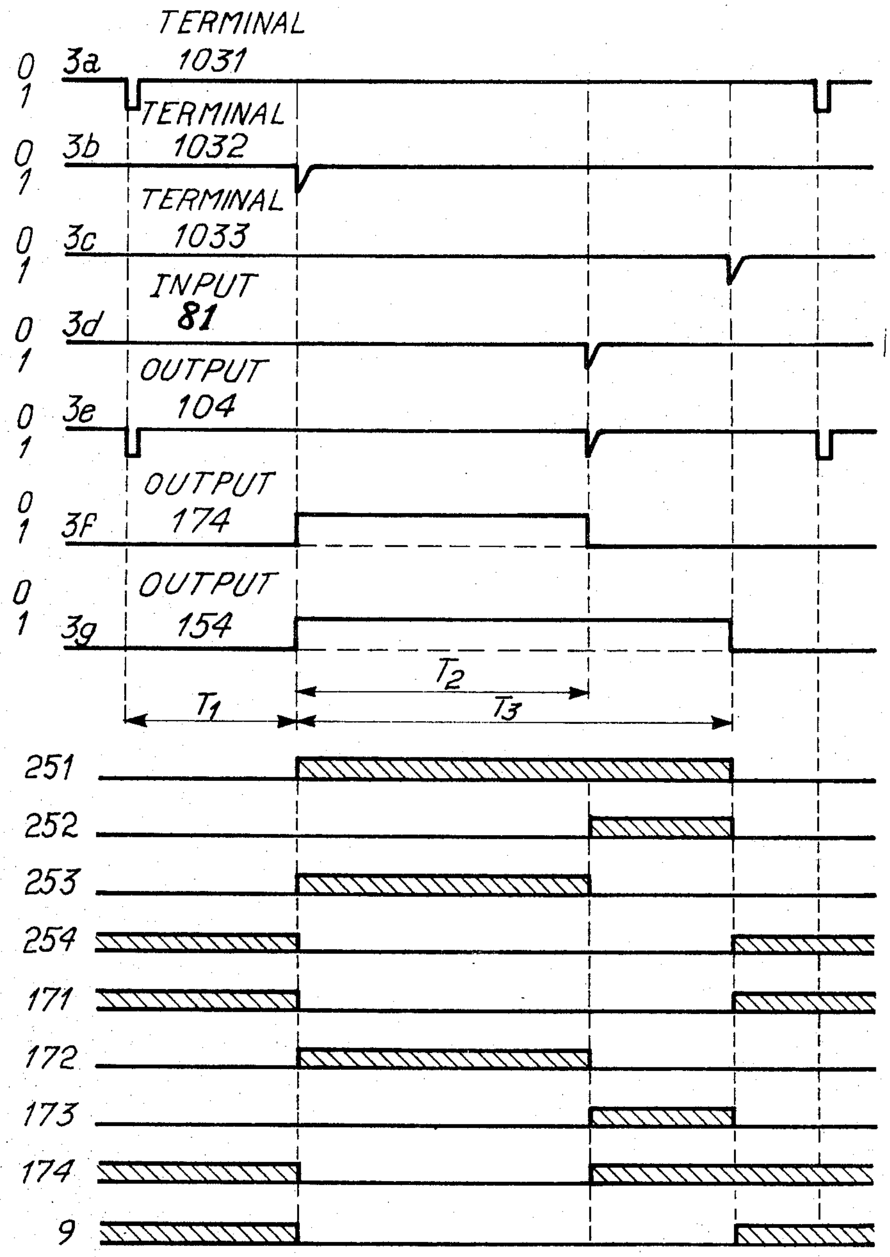
FIG. 3 is a diagram of signals at different points of the apparatus.

It appears from FIG. 3 that the end of period $T_2$ is the instant of occurrence of a pulse at the output of comparator 8.

The closing of the switches is represented in FIG. 3 by hatched parts. Thus it appears that during time $T_1$ the attenuator is shortcircuited by means of closed switch 9 and the amplifier noise is stored in capacitor 71 through closed switch 171. Capacitor 201 is being discharged through resistor 205 and closed switch 254 and capacitor 72 is being discharged through resistor 74 and closed switch 174.

During the period $T_2$, the diode current range is being scanned through closed switch 253 and the varying diode current is applied to capacitor 72 through closed switch 251, inserted attenuator 4 (switch 9 is open), and closed switch 172.

At the end of time $T_2$, the current scanning is inhibited due to the opening of switch 253. The capacitor 72 is disconnected from the detector due to the opening of switch 172; as capacitor 71 has been disconnected from the detector at the end of time $T_1$, the entire store circuit 7 is disconnected from the detector. During the period $(T_3 = T_2)$ the RMS voltmeter 208 is connected through closed switch 252 and capacitor 73 is discharged through closed switch 173.

It is to be noticed that, contrary to the prior art instruments, the instrument of the invention doe not form a servo-system as it would be the case if comparator 8 were a standard operational amplifier and its output signal were used to vary the anode current of the noise diode. In the invention the diode current is scanned and the scanning is stopped when the RMS voltage at the output of the detector reaches a predetermined value, i.e. that of the voltage stored in capacitor 71. During the measurement (switch 252 closed), the store circuit is disconnected from the amplifier and detector chain and the capacitor 201 of the heating current scanning device is isolated since switch 253 opens when switch 252 closes and discharge switch 254 is not yet closed.

Orders of magnitude are 5 seconds for $T_1$, 15 seconds for $T_3$ and from 2 to 8 seconds for $T_2$.

What we claim is:

1. In an apparatus for measuring the noise power of an amplifier device to be tested comprising a broad-band noise power source in the form of a temperature limited diode having an output resistor forming the input resistance of said amplifier device, first switching means for selectively connecting the output of said diode to said resistor and for cumulating the noise power created by the diode and the noise power of said amplifier device, pass-band filter means connected to the output of the amplifier device, attenuator means having an attenuating factor of $\sqrt{2}$, second switching means for selectively inserting said attenuator at the output of said filter means and detector means for detecting the noise power of the amplifier device alone and the cumulated noise power of the noise source and amplifier device attenuated by $\sqrt{2}$ and for deriving therefrom two RMS noise signals, two capacitors for respectively storing said RMS noise signals and a comparator for determining the equality of said signals, the improvement consisting of means for varying substantially linearly the heating current of the diode, means controlled by the comparator for stopping said varying means and means for measuring the anode current of the diode at the instant when the variation of the heating current has been stopped.

2. The improvement as claimed in claim 1, in which the varying means includes a capacitor and resistor circuit, means for charging said capacitor through said resistor, means for amplifying the charge current of the capacitor and means for applying the amplified charge current to the heater of the diode and in which the means for stopping the varying means of the heating current of the diode includes an interrupter switch inserted in said capacitor and resistor circuit.

3. In an apparatus for measuring the noise power of an amplifier device to be tested comprising a broad-band noise power source in the form of a temperature limited diode having an output resistor forming the input resistance of said amplifier device, first switching means for selectively connecting the output of said diode to said resistor and for cumulating the noise power created by the diode and the noise power of said amplifier device, pass-band filter means connected to the output of the amplifier device, attenuator means having an attenuating factor of $\sqrt{2}$, second switching means for selectively inserting said attenuator at the output of said filter means and detector means for detecting the noise power of the amplifier device alone and the cumulated noise power of the noise source and amplifier device attenuated by $\sqrt{2}$ and for deriving therefrom two RMS noise signals, two capacitors for respectively storing said RMS noise signals and a comparator for determining the equality of said signals, the improvement consisting of means for varying substantially linearly the heating current of the diode, a programmer circuit generating a first signal for actuating said first switching means into a position wherein the output of the diode is disconnected from the output resistor and the second switching means into a position wherein the attenuator is disconnected from said filter means and detector means and said filter means and detector means are directly connected therebetween, a second signal for actuating said first switching means into a position wherein the output of the diode is connected to the output resistor and the second switching means into a position wherein the attenuator is inserted between said filter means and detector means and for initiating the means for varying the heating current of the diode and a third signal coinciding with the instant at which the comparator detects the equality of the two RMS signals for stopping said varying means and for measuring the anode current of the diode.

* * * * *